(12) United States Patent
Inaguma et al.

(10) Patent No.: US 9,616,411 B2
(45) Date of Patent: Apr. 11, 2017

(54) HIGH AL-CONTENT STEEL SHEET EXCELLENT IN WORKABILITY AND METHOD OF PRODUCTION OF SAME

(71) Applicant: NIPPON STEEL & SUMIKIN MATERIALS CO, LTD, Tokyo (JP)

(72) Inventors: Toru Inaguma, Tokyo (JP); Takayuki Kobayashi, Tokyo (JP); Hiroaki Sakamoto, Tokyo (JP)

(73) Assignee: NIPPON STEEL & SUMKIN MATERIALS CO., LTD., Tokyo (JP)

( * ) Notice: Subject to any disclaimer, the term of this patent is extended or adjusted under 35 U.S.C. 154(b) by 182 days.

(21) Appl. No.: 14/687,696

(22) Filed: Apr. 15, 2015

(65) Prior Publication Data

US 2015/0217277 A1    Aug. 6, 2015

Related U.S. Application Data

(62) Division of application No. 11/665,164, filed as application No. PCT/JP2005/019449 on Oct. 18, 2005, now Pat. No. 9,028,625.

(30) Foreign Application Priority Data

Oct. 21, 2004   (JP) ................ 2004-306695
Oct. 5, 2005    (JP) ................ 2005-292063

(51) Int. Cl.
  *C21D 8/00*     (2006.01)
  *B01J 23/745*   (2006.01)
  (Continued)

(52) U.S. Cl.
  CPC ........... *B01J 23/745* (2013.01); *B01D 39/12* (2013.01); *B01D 53/885* (2013.01); *B01J 21/02* (2013.01);
  (Continued)

(58) Field of Classification Search
  CPC ..... B01J 35/04; B01J 37/0225; C21D 8/0205; C25D 5/50
  (Continued)

(56) References Cited

U.S. PATENT DOCUMENTS

| 4,762,575 A | 8/1988 | Sakakura et al. |
| 6,086,689 A | 7/2000 | Sassoulas et al. |
| 2009/0280350 A1 | 11/2009 | Inaguma et al. |

FOREIGN PATENT DOCUMENTS

| DE | 196 52 399 | 6/1998 |
| EP | 0 511 699 | 11/1992 |

(Continued)

OTHER PUBLICATIONS

Brazilian Office Action dated Jun. 9, 2013, issued in corresponding Brazilian Application No. PI0516949-6-8, and an English translation thereof.

(Continued)

*Primary Examiner* — Jie Yang
(74) *Attorney, Agent, or Firm* — Birch, Stewart, Kolasch & Birch, LLP (57) ABSTRACT

The present invention provides a high Al-content steel sheet having an excellent workability and a method of production of the same at a low cost by mass production, a high Al-content metal foil and a method of production of the same, and a metal substrate using a high Al-content metal foil, that is, a high Al-content steel sheet having an Al content of 6.5 mass % to 10 mass %, the high Al-content steel sheet characterized by having one or both of a {222} plane integration of an α-Fe crystal with respect to the surface of the steel sheet of 60% to 95% or a {200} plane integration of 0.01% to 15% and a method of production of (Continued)

the same, a high Al-content metal foil and a method of production of the same, and a metal substrate using a high Al-content metal foil.

6 Claims, 1 Drawing Sheet

(51) Int. Cl.

| | | |
|---|---|---|
| B01D 39/12 | (2006.01) | |
| B01D 53/88 | (2006.01) | |
| B01J 37/02 | (2006.01) | |
| B21B 3/02 | (2006.01) | |
| C22C 38/00 | (2006.01) | |
| C22C 38/06 | (2006.01) | |
| C22C 38/18 | (2006.01) | |
| C22C 38/20 | (2006.01) | |
| C22C 38/26 | (2006.01) | |
| C22C 38/28 | (2006.01) | |
| C23C 2/12 | (2006.01) | |
| C23C 2/26 | (2006.01) | |
| C23C 2/28 | (2006.01) | |
| C23C 26/00 | (2006.01) | |
| C25D 5/50 | (2006.01) | |
| C25D 7/06 | (2006.01) | |
| B01J 21/02 | (2006.01) | |
| B01J 35/00 | (2006.01) | |
| B01J 35/04 | (2006.01) | |
| B23K 1/00 | (2006.01) | |
| C21D 8/02 | (2006.01) | |

(52) U.S. Cl.
CPC .......... *B01J 35/0006* (2013.01); *B01J 35/04* (2013.01); *B01J 37/0225* (2013.01); *B21B 3/02* (2013.01); *B23K 1/0014* (2013.01); *C22C 38/004* (2013.01); *C22C 38/005* (2013.01); *C22C 38/06* (2013.01); *C22C 38/18* (2013.01); *C22C 38/20* (2013.01); *C22C 38/26* (2013.01); *C22C 38/28* (2013.01); *C23C 2/12* (2013.01); *C23C 2/26* (2013.01); *C23C 2/28* (2013.01); *C23C 26/00* (2013.01); *C25D 5/50* (2013.01); *C25D 7/06* (2013.01); *C21D 8/0205* (2013.01); *Y10T 428/1234* (2015.01)

(58) Field of Classification Search
USPC ........................................................ 148/531
See application file for complete search history.

(56) References Cited

FOREIGN PATENT DOCUMENTS

| | | |
|---|---|---|
| EP | 0 640 390 | 3/1995 |
| EP | 1 580 288 | 9/2005 |
| JP | 62-188756 | 8/1987 |
| JP | 64-004458 | 1/1989 |
| JP | 64-030653 | 2/1989 |
| JP | 02-254136 | 10/1990 |
| JP | 3-13559 | 1/1991 |
| JP | 04-80746 | 12/1992 |
| JP | 05-202449 | 8/1993 |
| JP | 06-8486 | 2/1994 |
| JP | 6-277707 | 10/1994 |
| JP | 2796732 | 9/1998 |
| JP | 3200160 | 6/2001 |
| JP | 2000-45032 | 2/2003 |
| JP | 2003-105506 | 4/2003 |
| JP | 2003-520906 | 7/2003 |
| JP | 2004-169110 | 6/2004 |
| JP | 2004-169114 | 6/2004 |
| RU | 2 080 458 | 5/1997 |
| WO | WO 99/18251 | 4/1999 |
| WO | 01/54899 | 8/2001 |
| WO | WO01/54899 | 8/2001 |
| WO | WO2004/046406 | 6/2004 |

OTHER PUBLICATIONS

European Office Action dated Jan. 8, 2013 issued in corresponding European Application No. 05 795 786.2.
Sudoh et al., Metallography: section 5.7, re-crystallized text structure, 1972, p. 127, lines 7-10 [with partial English translation].
European Search Report dated May 30, 2011 issued in corresponding European Application No. EP 05 79 5786.
Heubner Ulrich et al., English machine translation of DE 19652399 A1, Jun. 1998.

HIGH AL-CONTENT STEEL SHEET EXCELLENT IN WORKABILITY AND METHOD OF PRODUCTION OF SAME

CROSS-REFERENCE TO RELATED APPLICATION

This application is a divisional application of U.S. application Ser. No. 11/665,164 filed Apr. 11, 2007, which is a national stage application of International Application No. PCT/JP05/19449 filed Oct. 18, 2005, which claims priority to Japanese Application Nos. 2005-292063, filed Oct. 5, 2005, and 2004-306695, filed Oct. 21, 2004, each of which is incorporated by reference in its entirety.

TECHNICAL FIELD

The present invention relates to a high Al-content steel sheet and metal foil and methods of production of the same.

BACKGROUND ART

An Al-containing steel sheet comprised of iron plus aluminum is an alloy having a high temperature oxidation resistance and a high electrical resistance. Raising the Al concentration can be expected to improve these properties, but simultaneously the toughness falls and the workability remarkably drops. For this reason, the maximum Al concentration at which industrial mass production is possible in the ordinary steel-making and rolling process is just 6.5 mass %. Mass production technology for improving the workability and producing high Al-content steel sheet containing more Al is eagerly awaited.

As prior art for improving the workability of a high Al-content steel sheet, Japanese Patent Publication (B) No. 6-8486 describes adding prescribed amounts of P and REMs to improve the hot workability since the Ce in REMs is present in steel as a fine grain phosphate. However, this requires expensive additive elements and leads to higher costs. Further, the upper limit of the Al concentration described in this publication is 6.5 mass %.

Japanese Patent Publication (A) No. 1-4458 describes making 70% or more of the solidified structure of rapidly quenched ribbon columnar crystals so as to improve the toughness of stainless steel containing Al in a concentration of 1 to 7 mass %. However, considering the fact that special equipment is necessary for producing rapidly quenched ribbon and for the mass producibility of ribbon, the cost again ends up becoming higher.

Therefore, as a method of production of a high Al-content steel sheet, the method of depositing an Al or Al alloy on the surface of a steel sheet having a concentration of Al of less than 6.5 mass % able to be mass produced by the usual steel-making and rolling process and treating this by diffusion heat treatment to increase the Al concentration is known.

For example, Japanese Patent Publication (B) No. 4-80746 discloses, as art for efficiently rolling an Al plated material, a method of production of a metal substrate comprising plating the surface of a steel sheet with Ni, then plating it by Al or an Al alloy, rolling it to the thickness of the final product, then working it and assembling it into a metal substrate and treating it by diffusion heat treatment. Further, Japanese Patent Publication (A1) No. 2003-520906 describes, as a method of production of dimensionally stable Fe—Cr—Al foil steel sheet, coating it with Al or an Al alloy during which making the amount of coating 0.5 to 5 mass % of the entire mass so that the shrinkage in the length and/or width direction becomes 0.5% or less even in the uniform diffusion heat treatment after cold rolling. However, these methods of production do not aim at the effect of improvement of the toughness or workability of the high Al-content steel sheet after diffusion heat treatment.

Japanese Patent No. 3200160 describes, as a method of production of an Fe—Cr—Al alloy foil, depositing Al or an Al alloy on a stainless steel sheet containing a prescribed amount of B, treating it by diffusion heat treatment to make the deposited ingredient diffuse in the steel sheet and obtain a steel sheet containing Al in a concentration of 1 to 10 mass %, then cold rolling it by a reduction rate of 30% or more and annealing it in a range of 800° C. to 1200° C. one time or more so as to promote the uniform diffusion of B and improve the resistance to high temperature embrittlement. With this method of production, the cold rolling and annealing are repeated after the diffusion heat treatment, so the cost becomes higher.

DISCLOSURE OF THE INVENTION

As explained above, the methods disclosed in Japanese Patent Publication (B) No. 6-8486 and Japanese Patent Publication (A) No. 1-4458 improve the workability by using special additive elements or a rapid quenching apparatus and therefore result in higher costs. The methods of depositing Al or an Al alloy on a steel sheet and treating it by diffusion heat treatment to enrich the Al concentration disclosed in Japanese Patent Publication (B) No. 4-80746, Japanese Patent Publication (A1) No. 2003-520906, and Japanese Patent No. 3200160 are mainly disclosed as methods of production of catalyst substrates for exhaust gas purification (metal substrates) and are not art for improving the workability of high Al-content steel sheet after diffusion heat treatment. For this reason, while it is possible to deposit Al or an Al alloy on steel sheet, then treat it by diffusion heat treatment to produce high Al-content steel sheet, there was then the problem of a low workability and therefore breakage when rolling, bending, or otherwise working high Al-content steel sheet.

The present invention solves these problems by providing a high Al-content steel sheet having excellent workability and a method of production of the same at low cost by mass production, a high Al-content metal foil and method of production of the same, and a metal substrate using a high Al-content metal foil.

The inventors solved this problem by discovering that it is possible to impart excellent workability by controlling a high Al-content steel sheet having an Al content of 6.5 mass % to 10 mass % to a specific texture structure. Further, they discovered that by depositing Al or an Al alloy on a matrix steel sheet containing Al in an amount of 3.5 mass % to less than 6.5 mass % to obtain a laminate and cold rolling this laminate so as to impart working strain and then treating this by diffusion heat treatment to make the Al or Al alloy deposited on the surface diffuse in the steel sheet, it is possible to control the texture structure of the high Al-content steel sheet after diffusion heat treatment to the range of the present invention and as a result greatly improve the workability. The present invention has as its gist the following.

(1) A high Al-content steel sheet having an Al content of 6.5 mass % to 10 mass %, the high Al-content steel sheet characterized by having one or both of a {222} plane integration of 60% to 95% or a {200} plane integration of 0.01% to 15% of the α-Fe crystal with respect to the surface of the steel sheet.

(2) A high Al-content steel sheet as set forth in (1), characterized in that the steel sheet has a thickness of 0.015 mm to 0.4 mm.

(3) A high Al-content metal foil having an Al content of 6.5 mass % to 10 mass % and a steel sheet thickness of 0.005 mm to 0.1 mm, the high Al-content metal foil characterized by having one or both of a {222} plane integration of 60% to 95% or a {200} plane integration of 0.01% to 15% of the α-Fe crystal with respect to the surface of the steel sheet.

(4) A honeycomb structure comprised of a flat foil and corrugated foil of a metal foil superposed and wound up, the honeycomb structure characterized in that at least part of the metal foil is a high Al-content metal foil as set forth in (3).

(5) A metal substrate obtained by brazing together a honeycomb structure as set forth in (4) and a metal outer jacket.

(6) A metal substrate obtained by brazing together a honeycomb structure as set forth in (4) and a metal outer jacket, then carrying a catalyst layer.

(7) A method of production of high Al-content steel sheet excellent in workability characterized by comprising depositing Al or an Al alloy on at least one surface of a matrix steel sheet containing Al in an amount of 3.5 mass % to less than 6.5 mass % to obtain a laminate, imparting working strain to the laminate by cold working, then treating it by diffusion heat treatment.

(8) A method of production of high Al-content steel sheet as set forth in (7), wherein the method of deposition of the Al or Al alloy is hot dipping of Al or an Al alloy on the steel sheet.

(9) A method of production of high Al-content steel sheet as set forth in (7), wherein the method of deposition of the Al or Al alloy is the method of attachment of a foil of Al or an Al alloy to a steel sheet.

(10) A method of production of high Al-content steel sheet as set forth in (7), wherein the method of imparting working strain by cold working is cold rolling.

(11) A method of production of high Al-content steel sheet as set forth in (10), wherein a reduction rate a (%) of the laminate in the cold rolling is in a range satisfying the relations of the following (a) to (c):

$$20 \leq \alpha \leq 95 \quad (a)$$

$$35x-260 \leq \alpha \quad (b)$$

$$6.5 \leq x \quad (c)$$

(where, x is the average Al concentration of the steel sheet after diffusion heat treatment (mass %))

(12) A method of production of high Al-content steel sheet as set forth in (10) or (11), wherein a thickness t (mm) of the laminate after cold rolling is in a range satisfying the relations of the following (d) to (f):

$$0.015 \leq t \leq 0.4 \quad (d)$$

$$t \leq -0.128x+1.298 \quad (e)$$

$$6.5 \leq x \quad (f)$$

(where, x is the average Al concentration of the steel sheet after diffusion heat treatment (mass %))

(13) A method of production of high Al-content steel sheet as set forth in (7), wherein the diffusion heat treatment is performed at a temperature of 800 to 1250° C.

(14) A method of production of high Al-content steel sheet as set forth in (7) or (13), wherein the diffusion heat treatment is performed in an atmosphere of a non-oxidizing atmosphere.

(15) A method of production of high Al-content steel sheet as set forth in any one of (7) to (14), further comprising preheating the steel sheet, then forming the laminate.

(16) A method of production of high Al-content steel sheet as set forth in (15), wherein the preheating is performed at a temperature of 700 to 1100° C.

(17) A method of production of high Al-content steel sheet as set forth in (15) or (16), wherein the preheating is performed in an atmosphere of at least one of a vacuum, inert gas atmosphere, or hydrogen atmosphere.

(18) A method of production of high Al-content metal foil characterized by further cold rolling a high Al-content steel sheet obtained by a method of production as set forth in any of (7) to (17).

(19) A high Al-content metal foil obtained by a method of production as set forth in (18), the metal foil characterized in that the foil thickness is 5 to 100 μm.

(20) A honeycomb structure comprised of a flat foil and corrugated foil of a metal foil superposed and wound up, the honeycomb structure characterized in that part of the metal foil is a high Al-content metal foil as set forth in (19).

(21) A metal substrate obtained by brazing together a honeycomb structure as set forth in (20) and a metal outer jacket.

(22) A metal substrate obtained by brazing together a honeycomb structure as set forth in (20) and a metal outer jacket, then carrying a catalyst layer.

BEST MODE FOR CARRYING OUT THE INVENTION

Below, the present invention will be explained in more detail.

The inventors searched for a method for improving the workability with respect to bending, drawing, rolling, etc. in a high Al-content steel sheet with an Al content of 6.5 mass % to 10 mass % and discovered that by controlling the texture structure of the steel sheet to a specific range, cracks and breakage can be suppressed extremely effectively.

If the high Al-content steel sheet has an Al content of less than 6.5 mass %, even without the texture structure of the present invention, excellent workability is obtained. If over 10 mass %, the effects of intermetallic compounds etc. appear and even with the texture structure of the present invention, excellent workability can no longer be obtained. Therefore, the Al content was made 6.5 mass % to 10 mass %.

The texture structure of the present invention satisfies either the condition of the {222} plane integration of the α-Fe crystal with respect to the surface of the steel sheet being an extremely high level of 60% to 95% or the {200} plane integration being an extremely low level of 0.01% to 15%.

Here, the plane integration is measured by X-ray diffraction by MoKα-rays. Explained this in more detail, each sample was measured for the integrated intensity of 11 orientation planes of the α-Fe crystal parallel to the sample surface ({110}, {200}, {211}, {310}, {222}, {321}, {411}, {420}, {332}, {521}, {442}), then each measured value was divided by the theoretical integrated intensity of a sample of a random orientation, then the ratio of the {200} or {222} intensity was found as a percentage. This is shown by the following equation (I) by for example the {200} intensity ratio.

$$\{200\} \text{ plane integration}=[\{i(200)/I(200)\}/\Sigma\{i(hkl)/I(hkl)\}]\times 100 \quad (I)$$

where the symbols mean the following:

i(hkl): Actual measured integrated intensity of {hkl} plane at measured sample

I(hkl): Theoretical integrated intensity of {hkl} plane at sample having random orientation Σ: Sum for 11 orientation plans of α-Fe crystal Here, the integrated intensity of the sample having a random orientation may be found by preparing and measuring a sample.

If the high Al-content steel sheet has a {222} plane integration of less than 60% and the {200} plane integration becomes 15% or more, cracks or breakage easily occur at the time of drawing, bending, and rolling. Further, if the {222} plane integration exceeds 95% and the {200} plane integration is less than 0.01%, the effect becomes saturated and production becomes difficult. Therefore, the high Al-content steel sheet of the present invention is given the above texture structure.

The high Al-content steel sheet of the present invention preferably has a thickness of 0.015 mm to 0.4 mm. If the thickness is less than 0.015 mm, the production yield falls, so the lower limit of the steel sheet was made 0.015 mm. If over 0.4 mm, the texture structure of the present invention becomes hard to obtain and the workability drops, so the upper limit of the thickness was made 0.4 mm.

Further, surprisingly, the inventors discovered that when cold rolling the high Al-content steel sheet of the present invention to a metal foil of a thickness of 5 to 100 μm, the texture structure of the steel sheet is maintained between rollings and that the texture structure after cold rolling maintains a state whether either the {222} plane integration of the α-Fe crystal with respect to the surface of the metal foil surface is the extremely high level of 60% to 95% or the {200} plane integration is the extremely low level of 0.01% to 15% and the workability is excellent. For this reason, the high Al-content metal foil of the present invention can be easily bent, drawn, or otherwise worked without heat treatment or other softening treatment due to the effects of the texture structure regardless of being as cold rolled.

If the high Al-content metal foil after cold rolling has a {222} plane integration of less than 60% and a {200} plane integration of 15% or more, cracks and breakage easily occur at the time of drawing, bending, and rolling. Further, if the {222} plane integration becomes over 95% and the {200} plane integration becomes less than 0.01%, the effect becomes saturated and, further, production becomes difficult. Therefore, the high Al-content metal foil of the present invention is given the following texture structure. Here, the plane integration is measured in the same way as the method explained above.

When using a high Al-content metal foil as the material for a metal substrate described below, the range of the foil thickness is preferably made 5 to 100 μm. This is because if the foil thickness is less than 5 μm, the resistance to high temperature oxidation falls, while if over 100 μm, the wall thickness becomes larger and thereby the pressure loss of the exhaust gas becomes larger. This is not preferable as a catalyst substrate for exhaust gas purification. A more preferable foil thickness is 10 to 60 μm.

A honeycomb structure obtained by corrugating a high Al-content metal foil, then winding up a flat foil and corrugated foil increases the contact area with the exhaust gas and improves the exhaust gas purification ability. The metal foil of the present invention is excellent in workability, so can be easily corrugated and formed into a honeycomb structure as cold rolled and has excellent dimensional precision of working, so has small variation in corrugated height etc.

When using a honeycomb structure as the metal substrate, for example an Ni-based brazing material is used to braze a metal outer jacket over the honeycomb structure. The brazing is performed by placing a brazing material at the contact points of the corrugated foil and flat foil and between the honeycomb structure and outer jacket, then heating in a vacuum at 1000 to 1200° C. or so. A honeycomb structure using the high Al-content metal foil of the present invention is also excellent in brazeability and excellent in structural durability after brazing. As a result, the high Al-content metal foil and honeycomb structure produced according to the present invention are excellent in workability and simultaneously are excellent in toughness as well. When used as a metal substrate in exhaust gas, there is less cracking or breakage of the foil. Further, when depositing a catalyst layer on the metal substrate of the present invention, since the metal substrate has a high structural endurance, there is little delamination of the catalyst layer and therefore little drop in purification ability of exhaust gas at the time of use.

Next, a method of production of a high Al-content steel sheet of the present invention will be explained in detail below.

The inventors discovered that by depositing Al or an Al alloy on a matrix steel sheet containing Al in an amount of 3.5 mass % to less than 6.5 mass % to obtain a laminate, cold rolling this laminate, then treating it by diffusion heat treatment, it is possible to produce high Al-content steel sheet having Al in an amount of 6.5 mass % or more and that this high Al-content steel sheet has the texture structure of the present invention and has excellent workability. In particular, they discovered that by defining the reduction rate at the time of cold rolling the laminate and the thickness after cold rolling according to the desired concentration of Al in the steel sheet after the diffusion heat treatment, an excellent workability can be obtained and a high Al-content steel sheet can be easily worked. Further, they discovered that by preheating the steel sheet before depositing the Al or Al alloy, the effect of realizing excellent workability is remarkably improved. The reason is believed to be that by depositing Al or an Al alloy on a matrix steel sheet having 3.5 mass % to less than 6.5 mass % of a concentration of Al to obtain a laminate and cold rolling this laminate, the dislocation structure of the laminate and the interface structure of the matrix steel sheet and Al or Al alloy layer differ from the case obtained by the conventional method and as a result the microstructure of the steel sheet after diffusion heat treatment to increase the Al concentration changes and the workability is improved. Further, it is believed due to the preheating, the structural changes for realizing excellent workability acts more effectively.

Below, the limitative conditions of the present invention will be explained.

For the matrix steel sheet on which the Al or Al alloy is deposited, a steel sheet containing Al in an amount of 3.5 mass % to less than 6.5 mass % is used. This is because if including 3.5 mass % or more of Al in the matrix steel sheet in advance, the steel sheet is improved in workability after diffusion heat treatment. Further, the reason for making the Al concentration less than 6.5 mass % is that, as explained in the background art, steel sheet containing 6.5 mass % or more of Al has a low toughness and poor workability, so mass production is difficult. For this reason, the upper limit of the matrix steel sheet was made less than 6.5 mass %. The more preferable range of Al concentration of the matrix steel sheet is 4.2 to 6.0 mass %. Further, for the steel sheet forming this matrix, alloy ingredients able to give the mechanical characteristics or chemical characteristics sought in the final product are selected as other elements. For example, if a high temperature oxidation resistance is necessary, a ferrite-based stainless steel to which a suitable quantity of Cr or a rare earth element is added is selected. When a high strength is sought, a steel sheet to which an element enabling realization of solution strengthening or precipitation strengthening is added is used.

The Al or Al alloy is deposited on the steel sheet by hot dipping, electroplating, the dry process, the ground process, etc. No matter by which method it is deposited, the effect of the present invention can be obtained. Further, it is possible to add the desired alloy elements to the Al or Al alloy to be deposited and alloy them simultaneously with the increase in Al concentration. The amount of the Al or Al alloy to be deposited is determined in accordance with the thickness of the matrix steel sheet at the time of deposition, the concentration of Al in the steel sheet, and the desired concentration of Al after diffusion heat treatment. For example, when depositing an Al alloy of 90 mass % Al-10 mass % Si on both surfaces of a matrix steel sheet of a thickness of 0.4 mm having a 5 mass % Al concentration and making the concentration of Al after diffusion heat treatment 8.1 mass %, the thickness of deposition of the Al alloy per side is about 20 μm.

The present invention further features optimizes the conditions for cold rolling the laminate obtained by depositing Al or an Al alloy on a matrix steel sheet containing Al in an amount of 3.5 mass % to less than 6.5 mass % in accordance with the average concentration of Al of the steel sheet after the diffusion heat treatment. The laminate is cold rolled to change the dislocation structure of the laminate and the interface structure of the matrix steel sheet and Al or Al alloy. Due to this cold rolling, the steel sheet is remarkably improved in workability after the Al diffusion heat treatment. As explained above, this effect is remarkable when the concentration of Al of the matrix steel sheet is 3.5 mass % to less than 6.5 mass %. The inventors discovered that there is an optimum reduction rate of cold rolling of the laminate and thickness after cold rolling dependent on the concentration of Al after diffusion heat treatment and thereby completed the present invention.

Figure 1:
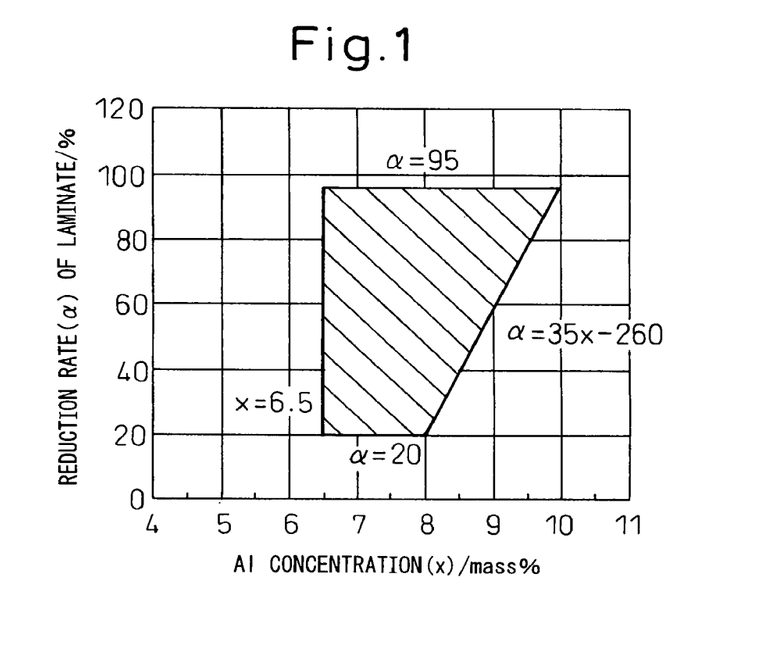
FIG. 1 shows the claims as defined by the reduction rate of the laminate and Al concentration (equations in figure show line segments)

The range of the reduction rate α (%) of the laminate in which particularly preferable effects can be obtained in the present invention may be illustrated as in FIG. 1. Here, the x (mass %) is the average Al concentration after diffusion heat treatment. The reason for making the reduction rate α(%) 20≤α≤95 is that, regardless of the Al concentration, if the reduction rate is less than 20%, since the amount of the working strain imparted is small, a large effect of improvement of the workability cannot be obtained. If over 95%, not only can no further improvement in the workability be recognized, but also the problem arises of partial delamination of the Al. The reason for the 40x−300≤α is that the higher the Al concentration, the lower the toughness of the steel sheet after diffusion heat treatment and the lower the workability, so to realize the effect of the present invention of the excellent workability, the higher the Al concentration, the larger the reduction rate must be made. Further, the present invention covers the method of production of steel sheet containing a high concentration of Al of 6.5 mass % or more, which is difficult to produce by the usual steel-making and rolling processes, so the concentration x of Al after diffusion heat treatment in the range of the reduction rate of the laminate was made x≤6.5 mass %. As explained above, by making the reduction rate α (%) of the laminate one in the above range in accordance with the Al concentration, it is possible to produce a high Al-content steel sheet excellent in workability.

Figure 2:
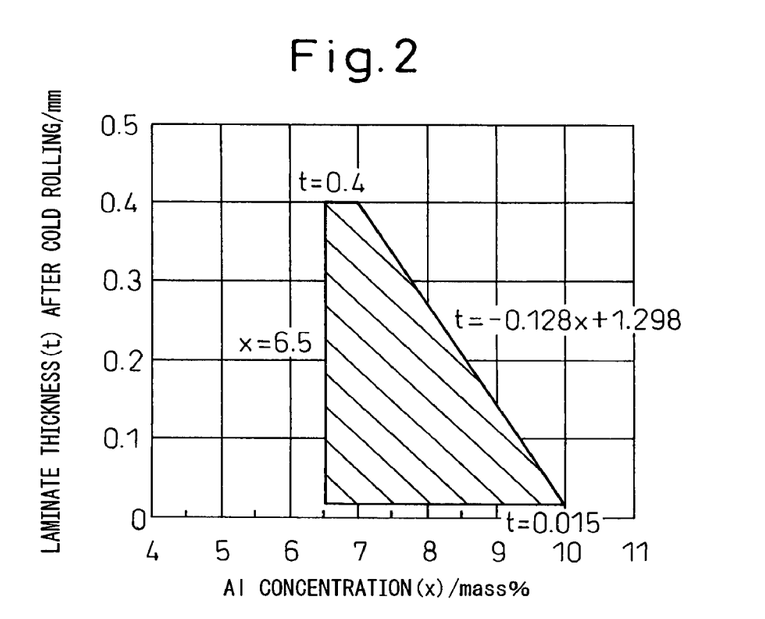
FIG. 2 shows the claims as defined by the laminate thickness after cold rolling and the Al concentration (equations in figure show line segments)

The range of the thickness t (mm) of the laminate after cold rolling in which particularly preferable effects can be obtained in the present invention may be illustrated as in FIG. 2. Here, the x (mass %) is the average concentration of Al after diffusion heat treatment. The reason why the thickness t (mm) of the laminate after cold rolling is made 0.015≤t≤0.4 is that if the thickness of the laminate after cold rolling is less than 0.015 mm, when cold rolling the laminate, the problem arises of partial delamination of the deposited Al or Al alloy and the yield falls, so the lower limit of t was made 0.015 mm. If over 0.4 mm, the Al diffusion heat treatment requires a high temperature or long heat treatment and the effect of the present invention of the improvement of workability after Al diffusion heat treatment becomes difficult to obtain, so the upper limit of t was made 0.4 mm. The reason for making t≤−0.128x+1.298 was that the higher the Al concentration, the lower the toughness of the steel sheet after diffusion heat treatment and the lower the workability, so to realize the effect of the present invention of the excellent workability, the higher the Al concentration, the smaller the laminate thickness must be made after cold rolling. The present invention covers the method of production of steel sheet containing a high concentration of Al of 6.5 mass % or more, which is difficult to produce by the usual steel-making and rolling processes, so the concentration x of Al after diffusion heat treatment in the range of the thickness after cold rolling was made x≥6.5 mass %. As explained above, by making the thickness t of the laminate after cold rolling one in the above range in accordance with the desired average concentration of Al after diffusion heat treatment, it is possible to produce a high Al-content steel sheet excellent in workability.

Here, cold rolling was mentioned as the optimal method of introducing working strain, but even if the drawing method, shot peening method, or another method able to impart working strain is used, the effect of the present invention can be obtained.

The temperature of the diffusion heat treatment is preferably 800° C. to 1250° C. This is because if less than 800° C. or more than 1250° C., the effect of the present invention of an excellent workability after diffusion heat treatment becomes difficult to obtain. A suitable time of the diffusion heat treatment is selected for causing the Al or Al alloy deposited on the surface to diffuse in the steel sheet. However, it is not necessary to make the Al or Al alloy deposited on the surface uniform in the steel sheet. No matter what the heat treatment atmosphere, that is, a vacuum atmosphere, Ar atmosphere, $H_2$ atmosphere, or other non-oxidizing atmosphere, the effect of the present invention of improvement of the workability can be obtained.

Further to realize an even better effect of the present invention, the matrix steel sheet before deposition of Al or an Al alloy may be preheated to 700° C. to 1100° C. This preheating is meant to rearrange the dislocation structure formed in the process of production of the matrix steel sheet selected and preferably causes recrystallization, but there is no particular need to cause recrystallization. If less than 700° C., changes in the dislocation structure for obtaining the more excellent effect of the present invention become difficult. If over 1100° C., an unpreferable oxide coating is formed on the surface of the steel sheet. This has a detrimental effect on the subsequent deposition of Al or Al alloy and cold rolling, so the preheating was made 1100° C. was less. No matter what the atmosphere of this preheating, e.g., in vacuum, an inert gas atmosphere, hydrogen atmosphere, or weakly acidic atmosphere, the above effects can be obtained, but conditions are sought which would not form an oxide film on the surface of the steel sheet which would have a detrimental effect on the deposition of Al or an Al alloy after preheating or the subsequent cold rolling. The preheating time does not have to be particularly limited, but if considering the producibility of high Al steel sheet, several seconds to several hours are suitable.

In the above way, by preheating the matrix steel sheet and by depositing the Al or Al alloy and cold rolling the laminate in the optimum ranges, the texture structure of the high Al-content steel sheet after the diffusion heat treatment falls within the range of the present invention and the workability is remarkably improved compared with the conventional method of production. By using a high Al-content steel sheet produced in accordance with the present invention, it becomes possible to work a high Al-content steel sheet having a 6.5 mass % or more Al concentration having a high temperature oxidation resistance and high electrical resistance, which was difficult to produce in the past, at a low cost. Therefore, the high Al-content steel sheet obtained according to the present invention can be efficiently cold rolled by for example a high reduction rate of 5% or more per pass and can be easily worked into a metal foil of a thickness of 5 to 100 μm.

As explained above, the high Al-content steel sheet or high Al-content metal foil produced according to the present invention has excellent workability and is useful for various applications such as automobile materials, electrical heating materials, chemical plant materials, or piping materials. Further, when using the metal foil using the method of the present invention for a metal substrate, it is useful for a metal substrate excellent in not only high temperature oxidation resistance, but also structural endurance and the delamination characteristic of the catalyst layer.

The high Al-content steel sheet after diffusion heat treatment obtained according to the present invention is not limited in chemical composition other than the Al concentration, but a typical range of composition (mass %) is Al: 6.5 to 10%, C: 2% or less, S: 0.1% or less, P: 0.1% or less, Si: 1% or less, Mn: 2% or less, and a balance of iron and unavoidable impurities and, in accordance with the characteristics sought from the final product, any alloy ingredient selected from Cr: 30% or less, Ni: 15% or less, Mo: 2% or less, W: 2% or less, V: 2% or less, Ti: 5% or less, Nb: 2% or less, B: 0.1% or less, Cu: 1% or less, Co: 10% or less, Zr: 1% or less, Y: 1% or less, Hf: 1% or less, La: 1% or less, Ce: 1% or less, N: 0.1% or less, etc.

EXAMPLES

Below, examples will be used to explain the present invention in further detail.

Example 1

In Example 1, the relationship of workability of a high Al steel sheet after diffusion heat treatment with respect to the Al concentration of the matrix steel sheet was investigated. For the texture structure, X-ray diffraction was used to find the {222} plane integration parallel to the surface of the steel sheet and the {200} plane integration. The method of measurement was as follows. Table 1 shows the results.

The vacuum melting method was used to melt ingots of ingredients containing, by mass %, Al concentrations of 0, 1, 3, 3.5, 4.3, 5, 5.5, 6, 6.4, and 7.0%, C: 0.007%, Si: 0.1%, Mn: 0.2%, Cr: 20%, Zr: 0.04%, La: 0.1%, and a balance of iron and unavoidable impurities. Each was then hot rolled to a 3.2 mm thickness, then cold rolled to a 0.4 mm thickness. The 0 to 6% Al materials could be produced without problem, but the 6.4% Al material partially suffered from hot rolling cracks. The 7.0% Al material was low in toughness, so could not be produced. At this time, the hot rolled sheet of the 7.0% Al material had a {222} plane integration of less than 60% and a {200} plane integration of over 15%—both not in the range of the present invention.

The matrix steel sheet having each Al concentration was plated with an Al alloy by the hot dipping method of Al. The plating bath had a composition of 90% Al-10% Si. Al alloy was deposited on both surfaces of the steel sheet. Here, the deposited Al alloy was adjusted in thickness as shown in Table 1 so that the Al concentration after diffusion heat treatment became constant. The laminate with the deposited Al alloy was cold rolled to a thickness of 0.1 mm. The reduction rate of the laminate of the sample of each Al concentration is shown in Table 1. After this, Al diffusion heat treatment was performed under conditions of 1000° C. and 2 hours under a reduced pressure hydrogen atmosphere to cause the Al deposited on the surface to diffuse in the steel sheet. The average Al concentration after the Al diffusion heat treatment was about 7.5 mass % for all samples. The workability was evaluated by running a tensile test at ordinary temperature and measuring the tensile elongation at break. The tensile test pieces were taken and tensile tests were conducted based on JIS Z 2201 and JIS Z 2241 (in the following examples as well, the tensile tests were run based on the JIS standard).

As clear from the results of Table 1, it was learned that in Invention Examples 1 to 5 where the matrix steel sheets had Al concentrations of 3.5 mass % to less than 6.5 mass %, the tensile elongations at break were improved. In Invention Examples 2 to 4 with Al concentrations of 4.2 to 6.0%, particularly excellent elongations at break were exhibited. In each case, the {222} plane integration was 60% or more and the {200} plane integration was 15% or less or within the range of the high Al-content steel sheet of the present invention. On the other hand, in Comparative Examples 1 to 3, the {222} plane integrations were less than 60% and the {200} plane integrations were over 15% or not in the range of the present invention.

TABLE 1

| Class | Matrix producibility | Matrix steel sheet Al concentration/mass % | Al alloy deposition thickness per side/μm | Reduction rate α of laminate/% | Evaluated elongation at break/% | Plane integration (%) {222} | Plane integration (%) {200} |
|---|---|---|---|---|---|---|---|
| Comp. Ex. 1 | Good | 0 | 53 | 80 | 2 | 45 | 23 |
| Comp. Ex. 2 | Good | 1 | 45 | 79 | 2 | 51 | 21 |
| Comp. Ex. 3 | Good | 3 | 30 | 78 | 3 | 53 | 18 |
| Inv. Ex. 1 | Good | 3.5 | 26 | 78 | 10 | 62 | 8 |
| Inv. Ex. 2 | Good | 4.3 | 21 | 77 | 13 | 70 | 2 |
| Inv. Ex. 3 | Good | 5 | 16 | 77 | 14 | 76 | 0.8 |
| Inv. Ex. 4 | Good | 5.5 | 13 | 76 | 13 | 74 | 0.2 |
| Inv. Ex. 5 | Good | 6 | 9 | 76 | 13 | 75 | 0.13 |
| Inv. Ex. 6 | Fair | 6.4 | 7 | 76 | 10 | 73 | 0.8 |
| Comp. Ex. 4 | Poor | 7 | — | — | Not possible | 37 | 26 |

Example 2

In Example 2, the effects of the reduction rate of the laminate with respect to the average Al concentration after diffusion heat treatment on the workability of the steel sheet after diffusion heat treatment was investigated. Vacuum melting was used to melt ingots of ingredients including, by mass %, C: 0.05%, Si: 0.3%, Mn: 0.2%, Al: 4.5%, Cr: 17%, and a balance of iron and unavoidable impurities. Each was hot rolled to a thickness of 3 mm, then cold rolled to a predetermined thickness. The Al was deposited by hot dipping of Al. The plating bath had a composition of 95% Al -5% Si. Al alloy was deposited on both surfaces of the steel sheet. After this, the laminate was cold rolled to the thickness described in Table 2. The thickness of the matrix steel sheet before deposition of the Al alloy and the thickness of the deposited Al alloy were adjusted to give the targeted average concentration of Al after diffusion heat treatment and reduction rate of the laminate. Table 2 describes the thickness of the matrix steel sheet before deposition of the Al alloy and the thickness of the deposited Al alloy per side. For each Al concentration, samples with constant thicknesses of the laminates after cold rolling and different reduction rates were prepared. After this, the samples were treated under the conditions described in Table 2 by Al diffusion heat treatment under an Ar atmosphere to make the Al alloy deposited on the surfaces diffuse in the steel sheets. The results of analysis of the average concentrations of Al after the Al diffusion heat treatment are shown in Table 2. The workability was evaluated by conducting a tensile test at ordinary temperature and measuring the tensile elongation at break.

X-ray diffraction was used to find the {222} plane integration parallel to the surface of the steel sheet and the {200} plane integration. The results are shown in Table 2. The method of measurement was as described above.

The sample with a reduction rate of 0% was produced by Al diffusion heat treatment without rolling the laminate, that is, by the conventional method of production. In this case, the elongation at break was a low 0.5% to 2%. The {222} plane integration was less than 60% and the {200} plane integration was over 15%—both of which not in the range of the present invention.

Next, at each of the Al concentrations, rolling the laminate improved the elongation at break compared with the conventional method of only performing Al diffusion heat treatment.

When the average Al concentration after diffusion heat treatment was 6.5 mass %, the elongation at break was greatly improved in the range of a reduction rate of the laminate of 20% or more. When the Al concentration was 7 mass %, the elongation at break was greatly improved in the range of a reduction rate of the laminate of 22% or more. When the Al concentration was 7.5 mass %, the elongation at break was greatly improved in the range of a reduction rate of the laminate of 22% or more. When the Al concentration was 8.3 mass %, the elongation at break was greatly improved in the range of a reduction rate of the laminate of 35% or more. When the Al concentration was 9.5 mass %, the elongation at break was greatly improved in the range of a reduction rate of the laminate of 75% or more. Further, at each of the Al concentrations, with a reduction rate of the laminate of 96%, the problem arose of partial delamination of the deposited Al.

From the above results, it is learned that if cold rolling a laminate on which an Al or Al alloy is deposited to impart working strain according to the present invention, the elongation at break after Al diffusion heat treatment is improved. Further, Table 2 shows the larger value of the lower limits of the reduction rate α (%), that is, α=35x−260 and α=20, with respect to the Al concentrations (mass %) for clarifying the range of the reduction rate where the effect of the present invention is more remarkably realized. Cases where the reduction rate is in this range and 95% or less are shown with asterisks. From these results, when the reduction rate aα is larger than the larger value of α=35x−260 and α=20, the elongation at break is 6% or more and a high Al-content steel sheet with excellent workability was obtained.

It could be confirmed that the high Al-content steel sheet produced by the above method of the present invention was in the range of the present invention, that is, had one or both of a {222} plane integration parallel to the steel sheet surface of 60% or more or a {200} plane integration of 15% or less.

TABLE 2

| Class | Matrix steel sheet thickness/mm | Al alloy deposition thickness per side/μm | Laminate thickness t after cold rolling/mm | Reduction rate α of laminate/% | Average Al concentration x/mass % | Al diffusion heat treatment temperature/° C. | Al diffusion heat treatment time/hr | Evaluated elongation at break/% | Larger of 35x − 260 and 20 | Plane integration (%) {222} | {200} |
|---|---|---|---|---|---|---|---|---|---|---|---|
| Comp. Ex. 5 | 0.33 | 10 | 0.35 | 0 | 6.5 | 1200 | 2 | 2 | 20 | 45 | 20 |
| Inv. Ex. 7 | 0.37 | 11 | | 10 | 6.5 | | | 5 | | 61 | 14 |
| Inv. Ex. 8 | 0.41 | 12 | | *20 | 6.5 | | | 9 | | 63 | 2.5 |
| Inv. Ex. 9 | 0.55 | 16 | | *40 | 6.5 | | | 12 | | 72 | 0.7 |
| Inv. Ex. 10 | 1.10 | 32 | | *70 | 6.5 | | | 13 | | 75 | 0.4 |
| Inv. Ex. 11 | 4.73 | 137 | | *93 | 6.5 | | | 12 | | 85 | 0.16 |
| Inv. Ex. 12 | 8.27 | 240 | | 96 | 6.5 | | | ◆12 | | 88 | 0.1 |
| Comp. Ex. 6 | 0.19 | 7 | 0.2 | 0 | 7 | 1100 | 2 | 1.5 | 20 | 42 | 23 |
| Inv. Ex. 13 | 0.22 | 8 | | 15 | 7 | | | 4 | | 62 | 13 |
| Inv. Ex. 14 | 0.24 | 9 | | *22 | 7 | | | 8 | | 65 | 2 |
| Inv. Ex. 15 | 0.37 | 14 | | *50 | 7 | | | 10 | | 73 | 0.64 |
| Inv. Ex. 16 | 0.75 | 27 | | *75 | 7 | | | 12 | | 75 | 0.35 |
| Inv. Ex. 17 | 3.11 | 113 | | *94 | 7 | | | 11 | | 86 | 0.13 |
| Inv. Ex. 18 | 4.66 | 170 | | 96 | 7 | | | ◆11 | | 89 | 0.07 |
| Comp. Ex. 7 | 0.18 | 8 | 0.2 | 0 | 7.5 | 1100 | 2 | 1.3 | 20 | 43 | 26 |
| Inv. Ex. 19 | 0.22 | 9 | | 15 | 7.5 | | | 3 | | 63 | 11 |
| Inv. Ex. 20 | 0.24 | 10 | | *22 | 7.5 | | | 8 | | 66 | 2.1 |
| Inv. Ex. 21 | 0.37 | 16 | | *50 | 7.5 | | | 10 | | 71 | 0.68 |
| Inv. Ex. 22 | 0.92 | 40 | | *80 | 7.5 | | | 11 | | 77 | 0.12 |
| Inv. Ex. 23 | 2.63 | 115 | | *93 | 7.5 | | | 10 | | 85 | 0.11 |
| Inv. Ex. 24 | 4.60 | 202 | | 96 | 7.5 | | | ◆9 | | 88 | 0.05 |
| Comp. Ex. 8 | 0.09 | 5 | 0.1 | 0 | 8.3 | 1000 | 2 | 1 | 30.5 | 41 | 22 |
| Inv. Ex. 25 | 0.13 | 7 | | 30 | 8.3 | | | 3 | | 62 | 12 |
| Inv. Ex. 26 | 0.14 | 8 | | *35 | 8.3 | | | 7 | | 68 | 3.5 |
| Inv. Ex. 27 | 0.36 | 20 | | *75 | 8.3 | | | 9 | | 73 | 0.56 |
| Inv. Ex. 28 | 1.12 | 63 | | *92 | 8.3 | | | 11 | | 82 | 0.05 |
| Inv. Ex. 29 | 2.25 | 125 | | 96 | 8.3 | | | ◆10 | | 87 | 0.03 |
| Comp. Ex. 9 | 0.04 | 3 | 0.05 | 0 | 9.5 | 950 | 2 | 0.5 | 72.5 | 53 | 18 |
| Inv. Ex. 30 | 0.07 | 5 | | 40 | 9.5 | | | 2 | | 61 | 12 |
| Inv. Ex. 31 | 0.15 | 11 | | 70 | 9.5 | | | 3 | | 70 | 1.2 |
| Inv. Ex. 32 | 0.17 | 13 | | *75 | 9.5 | | | 7 | | 76 | 0.21 |
| Inv. Ex. 33 | 0.73 | 54 | | *94 | 9.5 | | | 8 | | 82 | 0.04 |
| Inv. Ex. 34 | 1.09 | 80 | | 96 | 9.5 | | | ◆7 | | 88 | 0.03 |

1)*indicates invention examples included in range of reduction rate of laminates where effects of the present invention are expressed more remarkably.
2)◆indicates invention Examples 12, 18, 24, 29, 34 have problems of partial delamination of Al during rolling of laminate.

Example 3

In Example 3, the relationship of the workability of steel sheet after diffusion heat treatment in the case of holding the reduction rate of the laminate constant and different thicknesses of the laminate after cold rolling with respect to the average Al concentration was investigated.

The vacuum melting method was used to melt ingots of ingredients containing, by mass %, C: 0.01%, Si: 0.1%, Mn: 0.2%, Cr: 20%, Ti: 0.1%, Al: 5%, La: 0.03%, Ce: 0.03% and a balance of iron and unavoidable impurities. Each was then hot rolled to a 3.2 mm thickness, then cold rolled to a predetermined thickness. The Al was deposited by hot dipping of Al. The plating bath had a composition of 90% Al-10% Si. Al alloy was deposited on both surfaces of the steel sheet. After this, the laminate was cold rolled to the thickness described in Table 3. Here, the thickness of the steel sheet before deposition of the Al alloy and the amount of deposition of the Al alloy, like in Example 2, were adjusted to give the targeted average concentration of Al after diffusion heat treatment and reduction rate of the laminate. Table 3 describes the thickness of the steel sheet before deposition of the Al alloy and the thickness of the deposited Al alloy per side. After this, the samples were treated under the conditions described in Table 3 by Al diffusion heat treatment under an Ar atmosphere to make the Al alloy deposited on the surfaces diffuse in the steel sheets. The results of analysis of the average concentrations of Al after the Al diffusion heat treatment are shown in Table 3. The workability was evaluated by conducting a tensile test at ordinary temperature and measuring the tensile elongation at break.

X-ray diffraction was used to find the {222} plane integration and the {200} plane integration. The results are shown in Table 3. The method of measurement was as described above.

When the Al concentration was 6.5 mass %, the elongation at break was further greatly improved in the range of a laminate thickness after cold rolling of 0.4 mm or less. When the Al concentration was 7 mass %, the elongation at break was more improved in the range of a laminate thickness of 0.4 mm or less. When the Al concentration was 7.5 mass %, the elongation at break was more improved in the range of a laminate thickness of 0.3 mm or less. When the Al concentration was 8.5 mass %, the elongation at break was more improved in the range of a laminate thickness of 0.2 mm or less. When the Al concentration was 9.5 mass %, the elongation at break was improved at a laminate thickness of 0.05 mm. However, at all Al concentrations, when the laminate thickness after cold rolling was 0.01 mm, the problem arose of partial delamination of the deposited Al.

Table 3 shows the smaller value of the upper limits of the laminate thickness t (mm), that is, t=−0.1283x+1.2983 and t=0.4, with respect to the Al concentrations x (mass %) for clarifying the range of the thickness of the laminate after cold rolling where the effect of the present invention is more remarkably realized. Cases where the thickness of the laminate after cold rolling is in this range and is 0.015 mm or more are shown with asterisks. From these results, when the laminate thickness t (mm) after cold rolling is smaller than the smaller value of t=−0.1283x+1.2983 and t=0.4, the elongation at break becomes 9% or more and a high Al-content steel sheet excellent in workability can be obtained. However, when the laminate thickness t (mm) is 0.01 mm, the problem arose of partial delamination of the Al alloy when cold rolling the laminate and the yield dropped.

It could be confirmed that the high Al-content steel sheet produced by the above method of the present invention is in the range of the present invention having one or both of a {222} plane integration parallel to the surface of the steel sheet of 60% or more or a {200} plane integration of 15% or less.

of the laminate at this time was 75%. After this, the laminate was treated by Al diffusion heat treatment at 1000° C. for 2 hours in a vacuum atmosphere to cause the Al foil bonded to the surfaces to diffuse in the steel sheet. The result of analysis of the average concentration of Al after the Al diffusion heat treatment was 7 mass % in each case. The workability was evaluated by conducting a tensile test at ordinary temperature and measuring the tensile elongation at break. Further, X-ray diffraction was used to find the {222} plane integration parallel to the surface of the steel sheet and the {200} plane integration. The results are shown in Table 4. The method of measurement was as described above.

The not preheated sample and the sample preheated at 650° C. had elongations at break of about 12%, while the samples preheated at 700° C. to 1100° C. had elongations at break greatly improved to 16 to 23%. Further, Invention

TABLE 3

| Class | Matrix steel sheet thickness/mm | Al alloy deposition thickness per side/μm | Laminate thickness t after cold rolling/mm | Reduction rate α of laminate/% | Average Al concentration x/mass % | Al diffusion heat treatment temperature/° C. | Al diffusion heat treatment time/hr | Evaluated elongation at break/% | Smaller of −0.1283x + 1.2983 and 0.4 | Plane integration (%) {222} | {200} |
|---|---|---|---|---|---|---|---|---|---|---|---|
| Inv. Ex. 35 | 0.72 | 16 | 0.45 | 40 | 6.5 | 1250 | 3 | 8.5 | 0.4 | 58 | 2.3 |
| Inv. Ex. 36 | 0.64 | 14 | *0.4 | | 6.5 | 1200 | | 13 | | 72 | 0.2 |
| Inv. Ex. 37 | 0.48 | 11 | *0.3 | | 6.5 | 1150 | | 15 | | 73 | 0.13 |
| Inv. Ex. 38 | 0.32 | 7 | *0.2 | | 6.5 | 1100 | | 15 | | 76 | 0.09 |
| Inv. Ex. 39 | 0.16 | 4 | *0.1 | | 6.5 | 1000 | | 14 | | 76 | 0.07 |
| Inv. Ex. 40 | 0.08 | 2 | *0.05 | | 6.5 | 950 | | 14 | | 77 | 0.08 |
| Inv. Ex. 41 | 0.02 | 0.4 | 0.01 | | 6.5 | 900 | | ◆13 | | 79 | 0.06 |
| Inv. Ex. 42 | 0.85 | 26 | 0.45 | 50 | 7 | 1250 | 3 | 8 | 0.4 | 65 | 4.8 |
| Inv. Ex. 43 | 0.75 | 23 | *0.4 | | 7 | 1200 | | 11 | | 73 | 0.3 |
| Inv. Ex. 44 | 0.38 | 11 | *0.2 | | 7 | 1100 | | 12 | | 76 | 0.2 |
| Inv. Ex. 45 | 0.19 | 6 | *0.1 | | 7 | 1000 | | 13 | | 78 | 0.11 |
| Inv. Ex. 46 | 0.09 | 3 | *0.05 | | 7 | 950 | | 12 | | 80 | 0.1 |
| Inv. Ex. 47 | 0.02 | 1 | 0.01 | | 7 | 900 | | ◆12 | | 81 | 0.09 |
| Inv. Ex. 48 | 1.49 | 57 | 0.4 | 75 | 7.5 | 1200 | 3 | 7 | 0.336 | 67 | 5.3 |
| Inv. Ex. 49 | 1.12 | 42 | *0.3 | | 7.5 | 1150 | | 10 | | 75 | 0.3 |
| Inv. Ex. 50 | 0.74 | 28 | *0.2 | | 7.5 | 1100 | | 11 | | 77 | 0.22 |
| Inv. Ex. 51 | 0.37 | 14 | *0.1 | | 7.5 | 1000 | | 12 | | 79 | 0.17 |
| Inv. Ex. 52 | 0.19 | 7 | *0.05 | | 7.5 | 900 | | 13 | | 81 | 0.1 |
| Inv. Ex. 53 | 0.04 | 1 | 0.01 | | 7.5 | 900 | | ◆12 | | 82 | 0.09 |
| Inv. Ex. 54 | 1.13 | 61 | 0.25 | 80 | 8.5 | 1150 | 2 | 6.5 | 0.208 | 70 | 4.3 |
| Inv. Ex. 55 | 0.90 | 48 | *0.2 | | 8.5 | 1100 | | 9 | | 78 | 0.8 |
| Inv. Ex. 56 | 0.45 | 24 | *0.1 | | 8.5 | 1000 | | 10 | | 80 | 6.6 |
| Inv. Ex. 57 | 0.23 | 12 | *0.05 | | 8.5 | 950 | | 11 | | 81 | 0.5 |
| Inv. Ex. 58 | 0.05 | 2 | 0.01 | | 8.5 | 950 | | ◆10 | | 82 | 0.3 |
| Inv. Ex. 59 | 0.44 | 30 | 0.1 | 80 | 9.5 | 1000 | 2 | 6 | 0.079 | 71 | 3.3 |
| Inv. Ex. 60 | 0.22 | 15 | *0.05 | | 9.5 | 950 | | 9 | | 79 | 0.2 |
| Inv. Ex. 61 | 0.04 | 3 | 0.01 | | 9.5 | 950 | | ◆9 | | 83 | 0.15 |

1)*indicates invention examples included in range of reduction rate of laminates where effects of the present invention are expressed more remarkably.
2)◆indicates invention Example 41, 47, 53, 58, 61 have problems of partial delamination of Al.

Example 4

In Example 4, the effect of preheating was investigated. The vacuum melting method was used to melt ingots of ingredients containing, by mass %, C: 0.01%, Cu: 0.4%, Al: 5.2%, Cr: 19%, Nb: 0.4%, and a balance of iron and unavoidable impurities. Each was then hot rolled to a 3 mm thickness, then cold rolled to a thickness of 0.38 mm. After this, it was preheated at the temperature shown in Table 4 for 30 minutes. However, Invention Example 62 was not preheated. Next, Al foil of a thickness of 9 μm was bonded to both sides of the steel sheet to obtain a laminate. This laminate was then cold rolled to 0.1 mm. The reduction rate Example 68 preheated at 1200° C. had the problem of partial delamination of the Al when cold rolling the laminate clad with Al foil. From the above results, it was confirmed that by preheating according to the invention examples under a temperature of 700° C. to 1100° C., the high Al steel sheet after Al diffusion heat treatment can be further improved in workability. Further, it could be confirmed that each of the high Al-content steel sheets is in the range of the high Al-content steel sheet of the present invention where a {222} plane integration parallel to the surface of the steel sheet is 60% or more or a {200} plane integration is 15% or less.

TABLE 4

| Class | Preheating temperature/° C. | Evaluated elongation at break/% | Plane integration (%) {222} | {200} |
|---|---|---|---|---|
| Inv. Ex. 62 | — | 12 | 72 | 0.8 |
| Inv. Ex. 63 | 650 | 13 | 73 | 0.7 |
| Inv. Ex. 64 | 700 | 16 | 79 | 0.15 |
| Inv. Ex. 65 | 800 | 23 | 83 | 0.08 |
| Inv. Ex. 66 | 900 | 22 | 85 | 0.06 |
| Inv. Ex. 67 | 1100 | 20 | 80 | 0.15 |
| Inv. Ex. 68 | 1200 | ◆19 | 80 | 0.18 |

◆indicates invention Example 68 had the problem of partial delamination of Al

Example 5

In Example 5, the workability was evaluated under various conditions.

The method of production of the samples was similar to Example 3, but several samples were obtained by preheating a matrix steel sheet before deposition of an Al alloy at the preheating temperature shown in Table 5 for 1 minute in a hydrogen atmosphere. Table 5 shows the production conditions, that is, the thickness of the matrix steel sheet before deposition of the Al alloy, the preheating temperature, the thickness of deposited Al alloy per side, the thickness of the laminate after cold rolling, the reduction rate of the laminate, the Al diffusion heat treatment conditions, and the analysis value of the average Al concentration of the steel sheet after Al diffusion heat treatment. The workability was evaluated in the same way as above by the tensile elongation at break. Further, X-ray diffraction was used to find the {222} plane integration parallel to the surface of the steel sheet and the {200} plane integration. The results are shown in Table 5. The method of measurement was as described above.

When the Al concentration after Al diffusion heat treatment was 6.5 mass %, Comparative Example 10 with a reduction rate of the laminate of 0% had an elongation at break of 2%, while Invention Example 69 preheated at 800° C. and with a reduction rate after deposition of Al of 50% and a thickness of the laminate of 0.2 mm had an elongation at break of 22%.

When the Al concentration after Al diffusion heat treatment was 7.5 mass %, Comparative Example 11 with a reduction rate of the laminate of 0% had an elongation at break of 1.5%, while Invention Examples 70 to 72 preheated at 750° C. and with reduction rates after deposition of Al of 50, 75, and 88% and thicknesses of the laminate of 0.2, 0.1, and 0.05 mm, that is, raised in reduction rate and reduced in thickness, had elongations at break improved to 14, 16, and 18%.

When the Al concentration after Al diffusion heat treatment was 8.3 mass %, Comparative Example 12 with a reduction rate of the laminate of 0% had an elongation at break of 1%, while Invention Examples 73 to 76 preheated at 850° C. and with reduction rates after deposition of Al of 50, 75, 83, and 88% and thicknesses of the laminate of 0.2, 0.1, 0.07, and 0.05 mm, that is, raised in reduction rate and reduced in thickness, had elongations at break improved to 13, 14, 15, and 16%.

When the Al concentration after Al diffusion heat treatment was 9 mass %, Comparative Example 13 with a reduction rate of the laminate of 0% had an elongation at break of 0.5%, while Invention Examples 77 to 79 preheated at 700° C. and with reduction rates after deposition of Al of 75, 83, and 88% and thicknesses of the laminate of 0.1, 0.07, and 0.05 mm, that is, raised in reduction rate and reduced in thickness, had elongations at break improved to 12, 13, and 14%.

When the Al concentration after Al diffusion heat treatment was 9.5 mass %, Comparative Example 14 with a reduction rate of the laminate of 0% had an elongation at break of 0.5%, while Invention Example 80 preheated at 800° C. and with a reduction rate after deposition of Al of 90% and thickness of the laminate of 0.02 mm had an elongation at break improved to 11%.

In the case of the samples with the reduction rate of 0%, the elongations at break were low ones of 0.5% to 2%. In this case, the {222} plane integration was less than 60% and the {200} plane integration was over 15% -neither within the range of the present invention. On the other hand, it could be confirmed that the high Al-content steel sheets produced by the method of the present invention were in the range of the present invention, that is, had one or both of a {222} plane integration parallel to the steel sheet surface of 60% or more or a {200} plane integration of 15% or less.

From the above results, it could be confirmed that by preheating the matrix steel sheet before deposition of an Al alloy and selecting the reduction rate of the laminate and the thickness after cold rolling in accordance with the value of the average Al concentration x (mass %) after diffusion heat treatment to be in the range shown in FIG. 1 and FIG. 2, the high Al-content steel sheet after Al diffusion heat treatment was remarkably improved in elongation at break and exhibited even better workability of an elongation at break of 11% or more.

TABLE 5

| Class | Matrix steel sheet thickness/mm | Preheating temperature/° C. | Al alloy deposition thickness per side/μm | Thickness t of laminate after cold rolling/mm | Reduction rate α of laminate/% | Average Al concentration x/mass % | Al diffusion heat treatment temperature/° C. | Al diffusion heat treatment time/hr | Evaluated elongation at break/% | Plane integration (%) {222} | {200} |
|---|---|---|---|---|---|---|---|---|---|---|---|
| Comp. Ex. 10 | 0.19 | — | 4 | 0.2 | 0 | 6.5 | 1100 | 2 | 2 | 43 | 23 |
| Inv. Ex. 69 | 0.38 | 800 | 9 | 0.2 | 50 | 6.5 | 1100 | 2 | 22 | 83 | 0.08 |
| Comp. Ex. 11 | 0.19 | — | 7 | 0.2 | 0 | 7.5 | 1100 | 2 | 1.5 | 38 | 28 |
| Inv. Ex. 70 | 0.37 | 750 | 14 | 0.2 | 50 | 7.5 | 1100 | 2 | 14 | 85 | 0.12 |
| Inv. Ex. 71 | 0.37 | 750 | 14 | 0.1 | 75 | 7.5 | 1000 | 2 | 16 | 87 | 0.05 |
| Inv. Ex. 72 | 0.39 | 750 | 15 | 0.05 | 88 | 7.5 | 950 | 2 | 18 | 90 | 0.04 |
| Comp. Ex. 12 | 0.18 | — | 9 | 0.2 | 0 | 8.3 | 1100 | 2 | 1 | 45 | 21 |
| Inv. Ex. 73 | 0.36 | 850 | 18 | 0.2 | 50 | 8.3 | 1100 | 2 | 13 | 83 | 0.15 |
| Inv. Ex. 74 | 0.36 | 850 | 18 | 0.1 | 75 | 8.3 | 1000 | 2 | 14 | 85 | 0.1 |
| Inv. Ex. 75 | 0.37 | 850 | 19 | 0.07 | 83 | 8.3 | 950 | 2 | 15 | 88 | 0.05 |

TABLE 5-continued

| Class | Matrix steel sheet thickness/mm | Preheating temperature/° C. | Al alloy deposition thickness per side/μm | Thickness t of laminate after cold rolling/mm | Reduction rate α of laminate/% | Average Al concentration x/mass % | Al diffusion heat treatment temperature/° C. | Al diffusion heat treatment time/hr | Evaluated elongation at break/% | Plane integration (%) {222} | {200} |
|---|---|---|---|---|---|---|---|---|---|---|---|
| Inv. Ex. 76 | 0.38 | 850 | 19 | 0.05 | 88 | 8.3 | 900 | 2 | 16 | 93 | 0.03 |
| Comp. Ex. 13 | 0.09 | — | 5 | 0.1 | 0 | 9 | 1000 | 2 | 0.5 | 52 | 18 |
| Inv. Ex. 77 | 0.36 | 700 | 22 | 0.1 | 75 | 9 | 1000 | 2 | 12 | 86 | 0.11 |
| Inv. Ex. 78 | 0.37 | 700 | 23 | 0.07 | 83 | 9 | 950 | 2 | 13 | 89 | 0.06 |
| Inv. Ex. 79 | 0.37 | 700 | 23 | 0.05 | 88 | 9 | 900 | 2 | 14 | 91 | 0.08 |
| Comp. Ex. 14 | 0.017 | — | 1 | 0.02 | 0 | 9.5 | 850 | 2 | 0.5 | 48 | 20 |
| Inv. Ex. 80 | 0.176 | 800 | 12 | 0.02 | 90 | 9.5 | 850 | 2 | 11 | 92 | 0.05 |

Example 6

In Example 6, the workability of the steel sheet after diffusion heat treatment was evaluated by whether cold rolling was possible and, further, the oxidation resistance was evaluated. In addition, the {222} plane integration of the high Al-content metal foil obtained after cold rolling and the {200} plane integration were measured and compared with the evaluation of bendability of the metal foil performed later.

The samples of Comparative Examples 10, 11, 12, 13 and Invention Examples 69, 71, 74, 78 prepared in Example 5 were used to investigate whether a high Al steel sheet after diffusion heat treatment could be cold rolled to 0.02 mm. As shown in Table 6, the steel sheets of Comparative Examples 10, 11, 12, and 13 broke several times around the initial period of rolling down to 0.02 mm and the rolling workability became remarkably poor. The steel sheets of Invention Examples 69, 71, 74, 78 were all excellent in workability, so could be rolled down to 0.02 mm without breakage.

The {222} plane integration and the {200} plane integration of the high Al-content metal foil obtained by the cold rolling were not within the range of the present invention in any of Comparative Examples 10, 11, 12, and 13. The {222} plane integrations or the {200} plane integrations of the high Al-content metal foils of Invention Examples 69, 71, 74, and 78 were within the range of the present invention. When bent by corrugation, it was learned that the metal foils of the Comparative Examples 10, 11, 12, and 13 suffered from numerous cracks at the bent parts and were inferior in workability. It was learned that with the metal foils of Invention Examples 69, 71, 74, and 78, no cracks were seen and the workability was excellent.

The obtained 0.02 mm thick metal foil was cut into pieces, held in the atmosphere at 1100° C., and investigated for the oxidation resistance of the foil in terms of the time until causing abnormal oxidation where the increase in mass per unit volume rapidly rises. Compared with the conventional foil (thickness of 10 μm) including Al in a concentration of 5 mass % able to be produced by the usual steel-making and rolling processes, the time until abnormal oxidation started was extend to two times the 5% Al material in Invention Example 69 with 6.5% Al, 2.9 times in Invention Example 71 with 7.5% Al, 3.7 times in Invention Example 74 with 8.3% Al, and 4.4 times in Invention Example 78 with 9% Al.

As explained above, a high Al-content steel sheet obtained by control to the range of the present invention can be easily worked into a thin metal foil by cold rolling. Further, it is learned that high Al-content metal foils obtained by cold rolling further include a texture structure in the range of the present invention and have an excellent workability, so can be easily bent such as by corrugation. Further, these high Al-content metal foils have excellent resistance to high temperature oxidation, so can be used for metal substrates etc.

TABLE 6

| Class | Average Al concentration x/mass % | Thickness before cold rolling/mm | Cold reliability | Thickness after cold rolling/mm | Plane integration of high Al metal foil (%) {222} | {200} | Bendability of metal foil |
|---|---|---|---|---|---|---|---|
| Comp. Ex. 10 | 6.5 | 0.20 | Poor | 0.02 | 40 | 27 | Poor |
| Inv. Ex. 69 | 6.5 | 0.20 | Good | 0.02 | 82 | 1.3 | Good |
| Comp. Ex. 11 | 7.5 | 0.20 | Poor | 0.02 | 37 | 29 | Poor |
| Inv. Ex. 71 | 7.5 | 0.10 | Good | 0.02 | 85 | 1.2 | Good |
| Comp. Ex. 12 | 8.3 | 0.20 | Poor | 0.02 | 44 | 23 | Poor |
| Inv. Ex. 74 | 8.3 | 0.10 | Good | 0.02 | 83 | 1.8 | Good |
| Comp. Ex. 13 | 9.0 | 0.10 | Poor | 0.02 | 51 | 19 | Poor |
| Inv. Ex. 78 | 9.0 | 0.07 | Good | 0.02 | 87 | 1.8 | Good |

Example 7

In Example 7, metal substrates were assembled and examined for structural durability and adhesion of the catalyst layers. As the foil materials, a metal foil A of a thickness of 30 μm obtained by rolling a sample of Invention Example 74 to 0.03 mm was prepared. Further, as a comparative example, a laminate metal foil B obtained by depositing a 90% Si-10% Al alloy on both surfaces of a matrix steel sheet with an Al concentration of 1.5 mass % and other additive elements etc. similar to Invention Example 74 and with a thickness of 0.36 mm by hot dipping to a thickness of 42 μm a side, then rolling it to 0.03 mm without diffusion heat treatment was prepared. The foils A and B were corrugated and coated with Ni-based brazing powder, then the corrugated foils and flat foils were superposed and wound up to obtain 80 mm diameter honeycomb structures. These honeycomb structures were placed in outer jackets comprised of ferrite-based stainless steel and heat treated them in a vacuum at 1180° C. for 20 minutes. The foil A was brazed, while the foil B was brazed and simultaneously treated by diffusion heat treatment of Al. The Al concentrations of the foil A and foil B were both 8.3 mass %. After that, catalyst layers of γ-$Al_2O_3$ powder impregnated with platinum catalyst were formed, then the samples were subjected to a cooling and heating endurance test of repeated application of 1200° C. and 25° C. for 30 minutes each for 100 hours. The metal substrate using the foil A showed no abnormalities, while the metal substrate using the foil B had missing parts of foil, crushed honeycomb cells, and had chipped away parts the surrounding catalyst layer. Due to the above, it is learned that the metal substrate comprised of the metal foil obtained by the present invention is excellent in toughness, so is also excellent in structural durability and the delamination characteristic of the catalyst layer.

It is clear from the above that in the examples as well, the present invention gave high Al-content steel sheet excellent in workability. This high Al-content steel sheet can be easily worked into various shapes and is high in toughness, so is useful for use as a metal substrate serving as the base material of for example an exhaust gas purification catalyst substrate for an automobile.

INDUSTRIAL APPLICABILITY

By producing the high Al-content steel sheet of the present invention, the steel sheet after the diffusion heat treatment is remarkably improved in workability and working of a high Al-content steel sheet having an Al concentration of 6.5 mass %, which had been difficult in the past, can be performed at a low cost. The high Al-content steel sheet produced according to the present invention is excellent in workability, so can be easily worked in various shapes and further can be cold rolled to a thin foil. These are useful for the production of various heat resistant materials etc. such as base materials for catalyst substrates of automobiles etc. where for example high temperature oxidation resistance is required.

The invention claimed is:

1. A honeycomb structure comprised of a flat foil and corrugated foil of a metal foil superposed and wound up, said honeycomb structure characterized in that
   at least part of said metal foil is a high Al-content steel foil having an Al content of 6.5 mass % to 10 mass % and a steel foil thickness of 0.005 mm to 0.1 mm, and said high Al-content steel foil characterized by having
   a {222} plane integration of 79% to 95% or a {200} plane integration of 0.01% to 1.8% of the α-Fe crystal with respect to the surface of the steel foil and an elongation at break of 11 to 23%,
   wherein said steel foil is produced by a process comprising the steps of preheating a matrix steel sheet containing Al in an amount, by mass %, of 3.5% to less than 6.5% at a temperature of 750° C. to 1100° C.,
   depositing an Al or an Al alloy on at least one surface of the matrix steel sheet to obtain a laminate,
   imparting working strain to the laminate by cold rolling,
   treating the laminate by diffusion heat treatment, and
   further cold rolling the laminate.

2. The honeycomb structure as set forth in claim 1, wherein the high Al-content steel foil characterized by having a {222} plane integration of 79% to 95% and a {200} plane integration of 0.01% to 1.8% of the α-Fe crystal with respect to the surface of the steel foil.

3. A metal substrate obtained by brazing together a honeycomb structure as set forth in claim 2 and a metal outer jacket.

4. A metal substrate obtained by brazing together a honeycomb structure as set forth in claim 2 and a metal outer jacket, then carrying a catalyst layer.

5. A metal substrate obtained by brazing together a honeycomb structure as set forth in claim 1 and a metal outer jacket.

6. A metal substrate obtained by brazing together a honeycomb structure as set forth in claim 1 and a metal outer jacket, then carrying a catalyst layer.

* * * * *